United States Patent
Agarwal et al.

(10) Patent No.: US 11,844,134 B1
(45) Date of Patent: Dec. 12, 2023

(54) CELL SITE REPAIR PART PREDICTION MACHINE LEARNING SYSTEM

(71) Applicant: Sprint Communications Company L.P., Overland Park, KS (US)

(72) Inventors: Diksha Agarwal, Overland Park, KS (US); Hui-Lin Chang, Brambleton, VA (US); Lance P. Lukens, Templeton, CA (US); Daqi Li, Overland Park, KS (US); Leland John Garris, Austin, TX (US); Wayne Alexander Thompson, Stone Mountain, GA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 985 days.

(21) Appl. No.: 16/779,616

(22) Filed: Feb. 2, 2020

(51) Int. Cl.
| | |
|---|---|
| H04W 76/25 | (2018.01) |
| G06Q 10/0875 | (2023.01) |
| H04B 10/079 | (2013.01) |
| H04B 17/373 | (2015.01) |
| H04B 17/391 | (2015.01) |
| H04L 41/0631 | (2022.01) |
| H04W 76/00 | (2018.01) |

(52) U.S. Cl.
CPC ........ *H04W 76/25* (2018.02); *G06Q 10/0875* (2013.01); *H04B 10/0795* (2013.01); *H04B 17/373* (2015.01); *H04B 17/391* (2015.01); *H04L 41/0631* (2013.01); *H04W 76/00* (2013.01)

(58) Field of Classification Search
CPC .. H04W 76/25; H04W 76/00; G06Q 10/0875; H04B 10/0795; H04B 17/373; H04B 17/391; H04L 41/0631
See application file for complete search history.

(56) References Cited

U.S. PATENT DOCUMENTS

| | | | | |
|---|---|---|---|---|
| 2003/0162539 | A1* | 8/2003 | Fiut | H04W 24/00 455/67.11 |
| 2008/0040246 | A1* | 2/2008 | Fukamachi | B65G 1/1373 705/29 |
| 2021/0397503 | A1* | 12/2021 | Yeung | G06Q 10/20 |

* cited by examiner

*Primary Examiner* — Charles N Appiah
*Assistant Examiner* — Frank E Donado

(57) ABSTRACT

A cell site maintenance system. The system comprises a plurality of data stores, a processor, a memory coupled to the processor, and a part replacement prediction application stored in memory. When executed by the processor the application extracts features based on data read from the data stores, executes a plurality of part machine learning models, where each part machine learning model analyses some of the extracted features by a multi-label classification model trained for a specific part associated with that part machine learning model and each part machine learning model outputs a probability that the associated part can fix the cell site associated with the trouble ticket, and, based on a probability output by a part machine learning model associated with a first part exceeding a predefined threshold, determining that the first part is to be pulled from a part inventory to make ready for a service truck.

20 Claims, 5 Drawing Sheets

US 11,844,134 B1

CELL SITE REPAIR PART PREDICTION MACHINE LEARNING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication networks comprise cell sites that provide wireless communication links to mobile communication devices such as mobile phones or cell phones. The cell site provides communication coupling to a core network (e.g., a wired network) to mobile communication devices via the wireless link. The performance and service of cell sites are monitored by network operators to determine how best to configure and adjust the radio access network to provide quality communications service to subscribers. When a problem is reported with a cell site, sometimes a service man is dispatched to the cell site to diagnose the problem on-site.

SUMMARY

In an embodiment, a cell site maintenance system is disclosed. The system comprises a cell site alarms data store, a cell site parts replacement history data store, and a cell site trouble tickets data store. The system further comprises a processor, a non-transitory memory coupled to the processor, and a part replacement prediction application stored in the non-transitory memory. When executed by the processor, the part replacement prediction application reads data associated with a cell site trouble ticket from the cell site alarms data store, from the cell site parts replacement history data store, and from the cell site trouble tickets data store and extracts features based on the data read from the data stores. The application further executes a binary classification machine learning model that analyzes at least some of the extracted features to determine a probability that a part replacement can fix a cell site associated with the cell site trouble ticket and determines that the probability that a part replacement can fix the cell site associated with the cell site trouble ticket exceeds a first threshold. The application further executes a plurality of part machine learning models, where each part machine learning model analyses at least some of the extracted features by a multi-label classification model trained for a specific part associated with that part machine learning model and each part machine learning model outputs a probability that the associated part can fix the cell site associated with the trouble ticket and, based on a probability output by a part machine learning model associated with a first part exceeding a second predefined threshold, ordering the first part be pulled from a part inventory.

In another embodiment, a method of repairing a cell site is disclosed. The method comprises reading data associated with a cell site identified in a trouble ticket by an application executing on a computer system from a plurality of data stores, cleansing at least some of the data read from the data stores by the application, and extracting features from the cleansed data by the application, wherein some of the extracted features are associated with tokenization based on natural language processing. The method further comprises analyzing the extracted features by a binary classification machine learning model executed by the application to determine a probability that a part replacement can fix the cell site identified in the trouble ticket and determining by the binary classification machine learning model that the probability that a part replacement can fix the cell site identified in the trouble ticket exceeds a first threshold. The method further comprises executing each of a plurality of part machine learning models by the application, where each part machine learning model analyses the extracted features excluding those extracted features associated with the tokenization based on natural language processing by a multi-label classification model trained for a specific part associated with that part machine learning model and each part machine learning model outputs a probability that the associated part can fix the cell site associated with the trouble ticket and, based on a probability output by a part machine learning model associated with a first part exceeding a second predefined threshold, determining by the application that the first part is to be pulled from a part inventory to make ready for a service truck to visit the cell site.

In yet another embodiment, a method of repairing a cell site is disclosed. The method comprises reading data associated with a cell site identified in a trouble ticket by an application executing on a computer system from a plurality of data stores, extracting features from the data read from the data stores by the application, and analyzing the extracted features by a binary classification machine learning model executed by the application to determine a probability that a part replacement can fix the cell site identified in the trouble ticket. The method further comprises executing each of a plurality of part machine learning models by the application, where each part machine learning model analyses at least some of the extracted features by a multi-label classification model trained for a specific part associated with that part machine learning model and each part machine learning model outputs a probability that the associated part can fix the cell site associated with the trouble ticket and determining by the application a probability threshold for each of the plurality of parts. The method further comprises, based on a probability output by a part machine learning model associated with a first part exceeding a probability threshold determined for the first part, ordering by the application the first part to be delivered to a service truck, and dispatching by the application a service man to drive the service truck to a location of the cell site identified in the trouble ticket to repair the cell site using the part.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
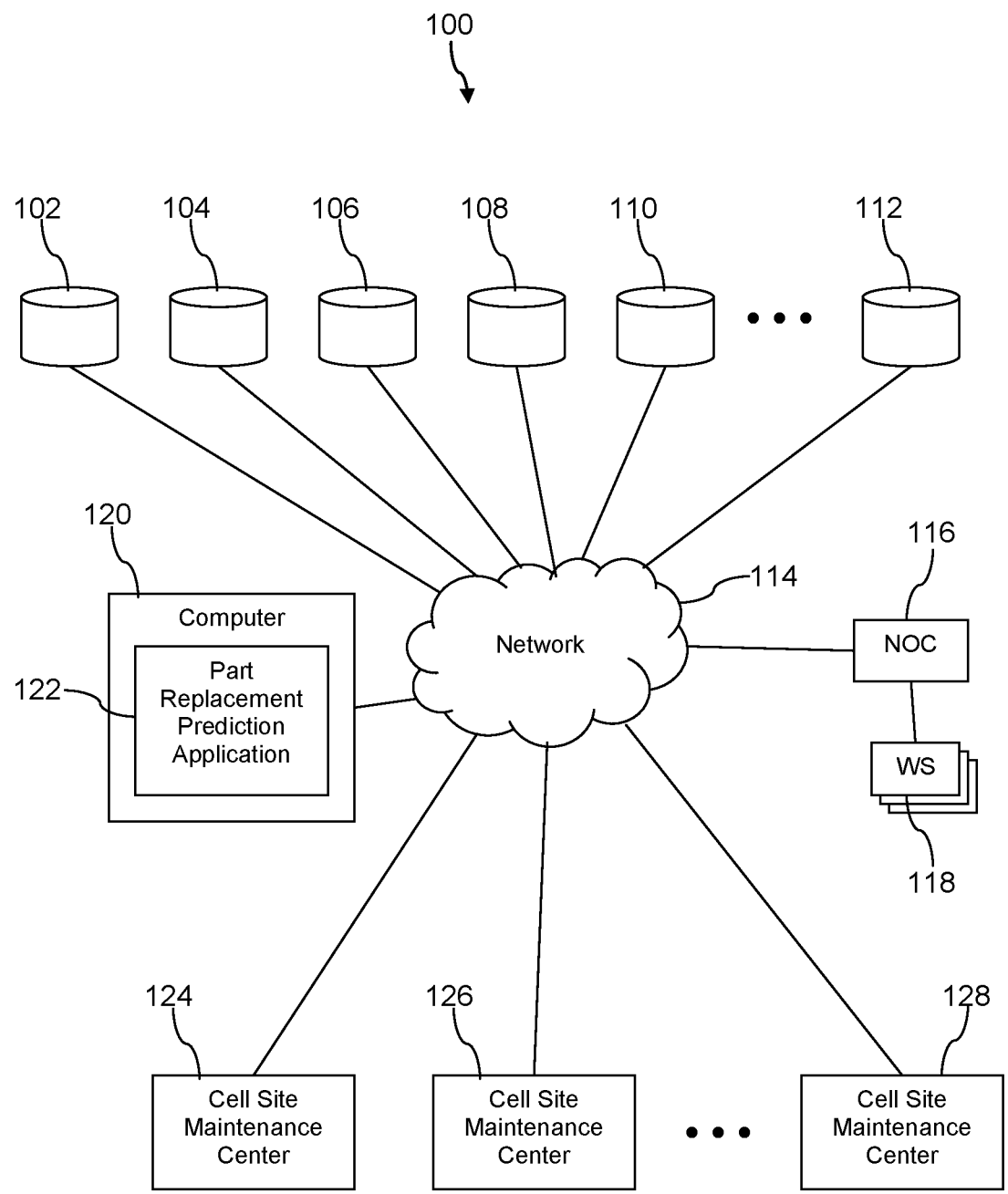
FIG. 1 is a block diagram of a cell site repair system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication service providers operate radio access networks (RANs) that may comprise 10 s of thousands of cell sites, for example 60,000 cell sites or more. To provide robust wireless communication service to its subscribers, service providers deploy equipment alarm systems and network operation centers (NOCs) that monitor and present alarms. Service providers may maintain cell site repair service centers or contract with cell site equipment vendors to provide cell site repair services. When an alarm related to a cell site is presented, a trouble ticket may be created recording the conditions associated with the alarm including the identity of the cell site, a service man and a service truck may be dispatched to drive to the cell site to clear the trouble ticket. In many cases, the service man while at the cell site determines that a replacement part is needed to repair the cell site and remove the condition causing the equipment alarm to be raised. The service truck may drive back to the service center, obtain the replacement part, and drive back to the cell site. If the replacement part does not repair the condition causing the alarm to be raised, the truck may drive back to the service center again, pick up a different replacement part, and drive to the cell site again to attempt to repair the site with the different replacement part.

The present disclosure teaches a cell site repair part prediction machine learning system. The system determines whether the alarm condition is likely to be solved by replacement of a part. About 37% of cell site trouble tickets are resolved by replacement of a part; the remaining 63% of cell site trouble tickets are resolved without replacement of parts, for example by resetting the cell site or by adjusting equipment without replacing it. A binary classification machine learning model is executed to determine the probability that replacement of a part can resolve the trouble ticket. If a replacement of a part is predicted to be needed, a plurality of multi-label classification machine learning models is executed. Each different multi-label classification machine learning model is trained to estimate the probability that replacement of a specific part of the cell site can repair the alarm condition and clear the trouble ticket. Thus, a first multi-label classification machine learning model trained for an 800 MHz radio estimates the probability that replacement of the 800 MHz radio at the cell site can repair the alarm condition; a second multi-label classification machine learning model trained for an antenna estimates the probability that replacement of the antenna at the cell site can repair the alarm condition; and a third multi-label classification machine learning model trained for a rectifier estimates the probability that replacement of the rectifier at the cell site can repair the alarm condition.

A probability produced by a multi-label classification machine learning model that is greater than a predefined threshold indicates that the associated part probably is needed to repair the alarm condition of the cell site. In some cases, multiple replacement parts are needed to repair a single alarm condition. The service man may then be directed to carry each of the different replacement parts projected to be needed to repair the alarm condition of the cell site during the first truck roll.

For example, the system may direct or order that the part or parts be pulled from inventory at the service center or maintenance center. The service man may then pick up the part or parts and place it on the service truck. Alternatively, the system may order that the part or parts be pulled from inventory and that the pulled part or parts be placed on the repair truck, for example by service center personnel tasked with readying service trucks. In an embodiment, the part or parts may be pulled, the service man may look at the service dispatch ticket which contains the probability determined for the likelihood the part or parts will resolve the trouble reported in the trouble ticket, and the service man may exercise discretion and judgment and decide whether or not to take the part or parts based in part on the probability recorded on the dispatch ticket. The decision by the service man to take or not take the parts may be recorded in a data store along with the results of the visit of the service truck to the cell site and these data may be used to train the machine learning models for future part predictions.

In this way, the cell site alarm condition may be repaired in a single truck roll, thereby reducing operating costs. In an example case, a cell site service vendor may charge $550 per truck roll. The system described above can reduce the number of truck rolls in two ways. First, because a replacement part is taken on the initial truck roll, a follow-up truck roll carrying the needed replacement part is avoided. Second, the system may further more accurately predict the needed replacement part and cause the correct replacement part to be carried on the first truck roll rather than a subsequent truck roll. The system may be able to better predict replacement parts than a human troubleshooter because it employs a plurality of sophisticated machine learning models and machine learning algorithms. The machine learning models are trained using a large amount of relevant cell site data and previous trouble ticket resolution histories. The analysis is performed by the machine learning models are based on a very rich data context related to the subject cell site and trouble ticket, contextual information that is unlikely to be known to a service man, if for no other reason than the service man cannot dedicate the time to pour through the large volume of available data.

In an embodiment, the probability threshold associated with the part specific multi-label classification machine learning models may be predefined. In another embodiment, the probability threshold associated with the part specific multi-label classification machine learning models may be algorithmically determined for each different trouble ticket. This may be referred to as a dynamic probability threshold. The dynamic probability threshold may be determined based on assessment of a current context, such as current inventory of replacement parts, distance of the subject cell site from a service center, and other contextual information. In another embodiment, different probability thresholds may be algorithmically determined for each different replacement part for each different trouble ticket based on a context that is at least partly specific to the specific replacement part, for example the quantity of that specific part in inventory at the service center and a history of turnover of that specific part at that service center.

The cell site repair part prediction machine learning system described herein provides a computer solution to the technological problem of keeping a complex RAN operating at high performance levels. The part prediction machine learning system improves upon existing processes by reducing truck rolls to resolve trouble tickets as well as resolving trouble tickets more quickly. By reducing truck rolls, operating costs are reduced and consumption of fossil fuels to propel the trucks is reduced. While the present disclosure describes a system for predicting part replacement to resolve problems with cell sites, the system taught herein may be advantageously applied to the management of service repair of other technological equipment.

Turning now to FIG. 1, a cell site repair part prediction machine learning system 100 is described. In an embodiment, the system 100 comprises a cell site alarms data store 102, a cell site trouble tickets data store 104, a cell site parts replacement history data store 106, and a cell site parts inventory data store 108. In an embodiment, the system 100 further comprises a machine learning training data store 110. In an embodiment, the system 100 may further comprise one or more additional data stores 112. The data stores 102-112 are communicatively coupled to a network 114 and are accessible for reading by qualified computing entities that are communicatively coupled to the network 114. The network 114 comprises one or more private networks, one or more public networks, or a combination thereof.

The system 100 comprises a network operation center (NOC) 116 that provides operation dashboards via a plurality of workstations (WS) 118 to NOC personnel such as operators, technicians, and/or engineers. The system 100 comprises a computer 120 that executes a part replacement prediction application 122. The part replacement prediction application 122 analyzes data from the data stores 102-112 in the context of a cell site trouble ticket and may identify one or more parts that it recommends to be carried by a service man in a service truck when visiting the cell site to resolve the cell site trouble ticket. It is understood that the part replacement prediction application 122 does not predict that a replacement part is needed to repair every cell site trouble ticket. For example, it may be that only about 37% of cell site trouble tickets are resolved by replacing a part.

The system 100 comprises a plurality of cell site maintenance centers, for example a first cell site maintenance center 124, a second cell site maintenance center 126, and a third cell site maintenance center 128. The system 100 may comprise on cell site maintenance center, two cell site maintenance centers, or more than three cell site maintenance centers but less than one thousand cell site maintenance centers. In an embodiment, the first cell site maintenance center 124 is operated by a first cell site vendor, the second cell site maintenance center 126 is operated by a second cell site vendor, and the third cell site maintenance center 128 is operated by a third cell site vendor. In some contexts, the cell site maintenance centers and/or the cell site vendors may be referred to as managed service vendors. The first cell site maintenance center 124 may be used to stock parts for repairing and/or upgrading cell site equipment sold by a first vendor. The second cell site maintenance center 126 may be used to stock parts for repairing and/or upgrading cell site equipment sold by a second vendor. The third cell site maintenance center 128 may be used to stock parts for repairing and/or upgrading cell site equipment sold by a third vendor.

Cell site alarms may be generated by automated software agents executing on various equipment items at cell sites and/or by network elements. When a cell site alarm occurs, the NOC 116 presents information about the alarm to one or more work stations 118. A record of the cell site alarm may also be created and stored as an entry in the cell site alarms data store 102. In an embodiment, the cell site alarm entries may be maintained in the cell site alarms data store 102 for at least three months, for at least six months, for at least nine months, for at least twelve months, for at least sixteen months, for at least twenty months, but less than three years. Alarms generated by cell site equipment associated with different vendors may use different terms to identify and describe alarm conditions.

NOC personnel may perform initial troubleshooting and, if they fail to resolve the alarm issue themselves, they may create a cell site trouble ticket and store it in the cell site trouble tickets data store 104. The cell site trouble ticket may identify one or more associated cell site alarms stored in the cell site alarms data store 102. The cell site trouble ticket may contain notes generated by the NOC operator, where the notes describe any troubleshooting steps taken by the NOC personnel. For example, the NOC operator may have performed a cell site reset that failed to clear one or more of the alarms and may report this in the notes. The NOC operator may have performed one or more automated tests on the cell site and recorded the test and result in the notes. For example, the NOC operator may have launched an automated antenna test. The NOC operator may have logged into one or more network elements associated with the subject cell site, determined the status of the network element, and recorded this action in the notes. Alternatively, the cell site trouble ticket may have a link that references notes generated by the NOC personnel. The cell site trouble ticket identifies the cell site experiencing the reported trouble. The cell site trouble ticket may further identify a vendor responsible for maintaining the associated cell site.

The part replacement prediction application 122 responds to creation of a new cell site trouble ticket by analyzing the cell site trouble ticket in the context of the trouble ticket and the data stored in the data stores 102-112. If the part replacement prediction application 122 predicts that one or more part is needed to repair the cell site, the part replacement prediction application 122 modifies the subject cell site trouble ticket to incorporate the identity of one or more parts recommended to be carried in a service truck on a first truck roll to repair the cell site. Further details on how the part replacement prediction application 122 operates are provided below.

Computer systems or personnel at the maintenance centers 124, 126, 128 may monitor the cell site trouble tickets data store 104 and identify when a cell site trouble ticket has been generated for which they are responsible. The responsible maintenance center 124, 126, 128 acknowledges that it has accepted responsibility for a cell site trouble ticket, loads any repair parts predicted to be needful in addressing the trouble ticket, and dispatches a service man in a service truck with any recommended parts. As stipulated above, only about 37% of cell site trouble tickets are addressed by replacing a part, and hence many truck rolls may be completed without carrying a part recommended by the part replacement prediction application 122. In an embodiment, the part replacement prediction application 122 or the NOC 116 automatically dispatch a service truck and service man from the responsible cell site maintenance center 124, 126, 128 without the subject cell site maintenance center manual accepting responsibility and dispatching a service truck.

Figure 2:
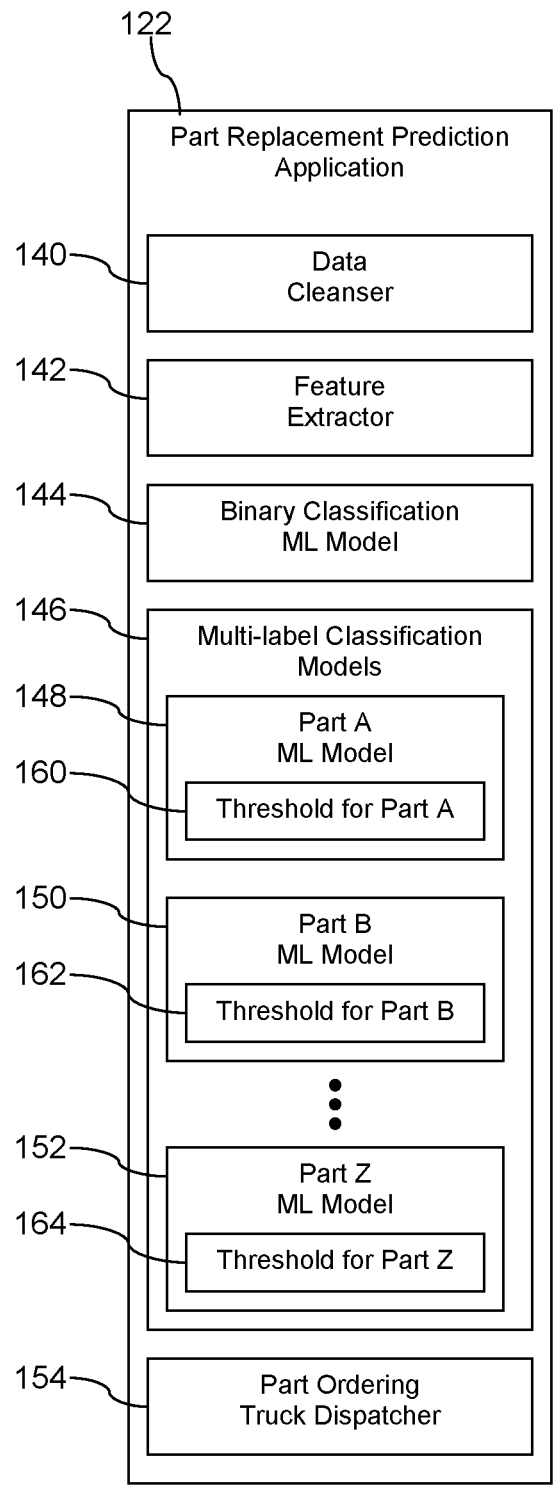
FIG. 2 is a block diagram of a part replacement prediction application according to an embodiment of the disclosure.

Turning now to FIG. 2, further details of the part replacement prediction application 122 are provided. In an embodiment, the part replacement prediction application 122 comprises a data cleanser 140, a feature extractor 142, a binary classification machine learning (ML) model 144, and a plurality of multi-label classification models 146. The multi-label classification models 146 may comprise a part A ML model 148, a part B ML model 150, and a part Z ML model 152. Each different multi-label classification model of the models 146 is associated with a different specific part of a cell site. For example, the part A ML model 148 may be associated with predicting the probability a part A—a radio for example—is needed to clear a cell site trouble ticket, the part B ML model 150 may be associated with predicting the probability a part B—a controller card for example—is needed to clear the cell site trouble ticket, and the part Z ML model 152 may be associated with predicting the probability a part Z—an antenna for example—is needed to clear the cell site trouble ticket. Thus the terms "part A," "part B," and "part Z" substitute for appropriate replacement part names. In an embodiment, the top twenty-five most commonly replaced cell site parts are associated with its own part ML model (i.e., there may be twenty-five different part ML models). In another embodiment, there may be a different number of part ML models. In an embodiment, the part replacement prediction application 122 may further comprise a part ordering truck dispatcher 154.

When the part replacement prediction application 122 processes a cell site trouble ticket, various data associated with the cell site trouble ticket is collected, for example by reading germane data from the data stores 102-112. At least some of the data read by the application 122 is cleansed by the data cleanser 140. The data cleanser 140 may modify some of the data to make it more amenable for processing by the binary classification ML model 144 and the multi-label classification models 146. For example, null data values may be removed or an imputed value assigned by the data cleanser 140. For example, inconsistent data may be modified to be consistent by the data cleanser 140. As an example a first trouble ticket may state "LA METRO" and a second trouble ticket may state "LA Metro." The data cleanser 140 may alter one or both of these to a consistent orthography. The data cleanser 140 may modify the data in other ways.

After processing the data by the data cleanser 140, the cleansed data may be processed by the feature extractor 142 to extract information from the data that can be better processed by the binary classification ML model 144 and the multi-label classification models 146. The data may be processed with a one-hot encoding (OHE) method executed by the feature extractor 142. OHE may be used for indicating a state of a state machine and may promote faster execution of the ML models. The data may be processed with a feature hashing method executed by the feature extractor 142 to transform high cardinality data to lower cardinality data, whereby to make it easier to process by the ML models, for example by turning arbitrary features into indices in a vector or matrix based on applying a hash function.

The data may be processed by a term frequency analysis method executed by the feature extractor 142, for example a term frequency-inverse document frequency (tf-idf) method. A term frequency analysis method may be beneficially applied in natural language processing to evaluate the importance of natural language terms, for example by assigning a weight to a term encountered in analyzing data based on the frequency of the occurrence of the same or like term in a relevant data store. In an embodiment, the term frequency analysis method may be applied specifically to analyzing natural language notes added to or referenced by cell site trouble tickets. In an embodiment, the output of the term frequency analysis method may be processed with a tokenization method executed by the feature extractor 142, for example a Watson Explorer Content Analytics process to partially reduce the dimensionality of the natural language data, and then process the data further with a truncated singular value decomposition (SVD) method executed by the feature extractor 142 to reduce the dimensionality of the analysis results and make the data more amenable to processing by the binary classification ML model 144.

In an embodiment the transformed data may be processed by a feature scaling method executed by the feature extractor 142 to normalize the data. The transformed data may be provided as input to the binary classification ML model 144. It is understood that the binary classification ML model 144 comprises a machine learning model as well as executable instructions or computer software that executes by processing the input data based on its machine learning model. The role of the binary classification ML model 144 is to predict whether or not any part is likely to be needed to repair a cell site. If no part is deemed needed to address the subject trouble ticket, the part replacement prediction application 122 concludes its processing and passes this information along, for example to the NOC 116 or by attaching an indication that no part is thought needed to the subject cell site trouble ticket. In an embodiment, the binary classification ML model 144 is implemented as a Keras neural network. In another embodiment, the binary classification ML model 144 is implemented in a different way.

If a part is deemed to be needed, the multi-label classification models 146 are executed and are passed the transformed data as input. It is understood that each of the part ML models 148, 150, 152 comprises a machine learning model as well as executable instructions of computer software that executes by processing the input data based on its machine learning model. In an embodiment, the transformed data produced by the term frequency analysis method is withheld from the part ML models 148, 150, 152, because processing this type of transformed data may excessively bog down the part ML models 148, 150, 152. In an embodiment, the part ML models 148, 150, 152 are decision tree-type ML models that perform poorly on high dimensional data such as is output by the natural language feature extraction.

In an embodiment, a probability that a specific part is needed may be compared to a threshold. If the probability exceeds the predefined threshold, the specific part is deemed needed to repair the problem identified in the cell site trouble ticket. In an embodiment, the same predefined threshold is employed by all of the part ML models 148, 150, 152. Alternatively, in an embodiment, each part ML model 148, 150, 152 are configured with its own predefined threshold, and these individual predefined thresholds may differ from each other. For example, the part A ML model 148 may comprise a first predefined threshold 160, the part B ML model 150 may comprise a second predefined threshold 162, and the part Z ML model 152 may comprise a third predefined threshold 164. In an embodiment, each of the predefined thresholds 160, 162, 164 may be different from each other. In an embodiment, the multi-label classification models—the part A ML model 148, the part B ML model 150, and the part Z ML model 152—are implemented as Random Forest MLs. In another embodiment, however, the multi-label classification models are implemented differently.

It is noted that the use of a binary classification ML model 144 using a deep neural network process has advantages in deciding a binary question such as "is a part replacement needed?" At the same time, the use of decision tree-based part ML models, each tuned to evaluate the probability a specific part needs replacement, has advantages over a deep neural network in performing its specific processing. The combination of the use of these two different machine learning approaches provides a desirable synergy and benefit in the disclosed parts replacement prediction application 122. It is also an advantage of the use of different part ML models for evaluating the probability that a specific part is needed to be replaced that the ML model for each different part can be tuned for that specific part. The ML model for a radio part can be tuned for that radio part and independently of tuning of a ML model for a controller part. The ML model for the controller part can be tuned for that controller part and independently of the tuning of the ML model for the radio part.

The machine learning models embedded in the binary classification ML model 144 and in the multi-label classification models 148, 150, 152 may be periodically trained using outputs (replacement part predictions) of the part replacement prediction application 122 and data in the data stores 102-112. For example, the final resolution of cell site trouble tickets in the cell site trouble ticket data store 104 may be compared to replacement part predictions rendered by the part replacement prediction application 122. In this way, the machine learning models in the binary classification ML model 144 and the multi-label classification models 148, 150, 152 may be iteratively improved and up-dated.

In an embodiment, the thresholds 160, 162, 164 may be statically defined. In another embodiment, the thresholds 160, 162, 164 may be dynamically defined. For example, the thresholds 160, 162, 164 may be calculated and defined on each iteration of the subject part ML model 148, 150, 152 based on data in the cell site parts inventory data store 108. There is a cost associated with removing a part from inventory and returning the same part to inventory, for example when the part replacement prediction application 122 predicts that a part is needed to repair a problem reported in a cell site trouble ticket but in fact the part was not needed to affect the repair. This cost can be related to a variety of different factors such as a cost of carrying a higher amount of inventory on an on-going basis and a cost of inspecting and/or testing the part before returning it to inventor. This cost may vary over time. For example, if 3 instances of a part are indicated by the cell site part inventor data store 108 to be in inventory, the cost of taking one of those parts out of inventory and later returning it may be relatively smaller because no additional inventory of the part was ordered (2 instances of the part remained in inventory). By contrast, if only 1 instance of the same part is indicated to be in inventory, the cost of taking that part out of inventory and later returning it may be relatively greater because an additional instance of the part was ordered.

In an embodiment, the part ordering truck dispatcher 154 automatically sends a dispatch order to one of the cell site maintenance centers 124, 126, 128 after the part replacement prediction application 122 has completed its work. The dispatch sent by the part ordering truck dispatcher 154 can identify a cell site, can identify an associated cell site trouble ticket, and can identify one or more replacement parts that should be carried along in a service truck during a visit to the subject cell site by a service technician. Alternatively, the dispatch sent by the part ordering truck dispatcher 154 can identify a cell site, can identify an associated cell site trouble ticket, and can dispatch a service truck and a service technician while also indicating no replacement part is deemed needed to resolve the cell site trouble ticket.

Figure 3:
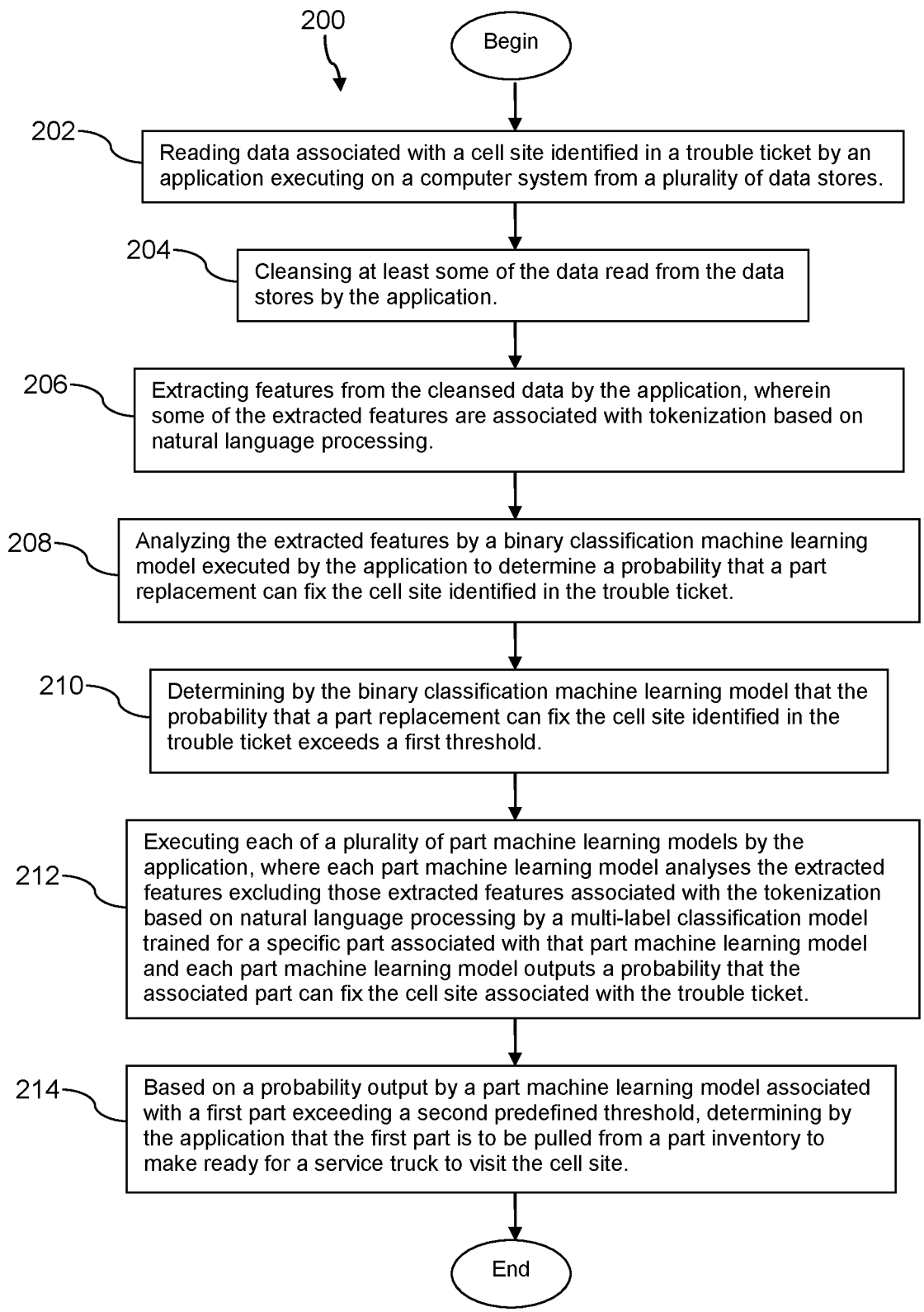
FIG. 3 is a flowchart of a method according to an embodiment of the disclosure.

Turning now to FIG. 3, a method 200 is described. In an embodiment, method 200 is a method of repairing a cell site. At block 202, the method 200 comprises reading data associated with a cell site identified in a trouble ticket by an application executing on a computer system from a plurality of data stores. At block 204, the method 200 comprises cleansing at least some of the data read from the data stores by the application. For example, an imputed value may be assigned in the place of a null value in the data and other data may be modified to achieve consistent orthography.

At block 206, the method 200 comprises extracting features from the cleansed data by the application, wherein some of the extracted features are associated with tokenization based on natural language processing. At block 208, the method 200 comprises analyzing the extracted features by a binary classification machine learning model executed by the application to determine a probability that a part replacement can fix the cell site identified in the trouble ticket. In an embodiment, the processing of block 206 further comprises performing feature scaling on extracted features before analyzing the extracted features by the binary classification machine learning model.

At block 210, the method 200 comprises determining by the binary classification machine learning model that the probability that a part replacement can fix the cell site identified in the trouble ticket exceeds a first threshold. At block 212, the method comprises executing each of a plurality of part machine learning models by the application, where each part machine learning model analyses the extracted features excluding those extracted features associated with the tokenization based on natural language processing by a multi-label classification model trained for a specific part associated with that part machine learning model and each part machine learning model outputs a probability that the associated part can fix the cell site associated with the trouble ticket. In an embodiment, the plurality of part learning models comprise a first radio learning model associated with a radio manufactured by a first vendor, a second radio learning model associated with a radio manufactured by a second vendor, a controller card learning model, an antenna learning model, a router learning model, and a rectifier learning model.

At block 214, the method 200 comprises, based on a probability output by a part machine learning model associated with a first part exceeding a second predefined threshold, determining by the application that the first part is to be pulled from a part inventory to make ready for a service truck to visit the cell site. In an embodiment, the processing of block 214 may further comprise commanding the first part be pulled from the part inventory and made available for a service man to pick up and load onto the service truck. In an embodiment, the service man may use his own judgment whether to put the first part on the service truck or not. In an embodiment, the service man is provided with the probability estimate produced by the application and may use this probability determination in forming a judgment whether to take the part or not. In an embodiment, the probability associated with all the different parts evaluated by the machine learning model are provided to the service man, and he may decide to take one or more other parts that are associated with a probability output that does not exceed the second predefined threshold. For example, the probability that a second part will fix the problem may be about 50% and the probability that a third part will fix the problem may be about 50%. In this case, the service man may understand that the probability of either the second part or the third part, if both taken with him in the service truck, will repair the problem is close to 100%. In this case, the service man may prudently pull both parts from inventory, carry them in the service truck, fully understanding that one of the parts will need to be returned to inventory and incur a restocking cost, but that the restocking cost is less than the cost of a second truck roll. In an embodiment, the second predefined threshold is about 80%. In another embodiment, the second predefined threshold is about 75%.

Figure 4:
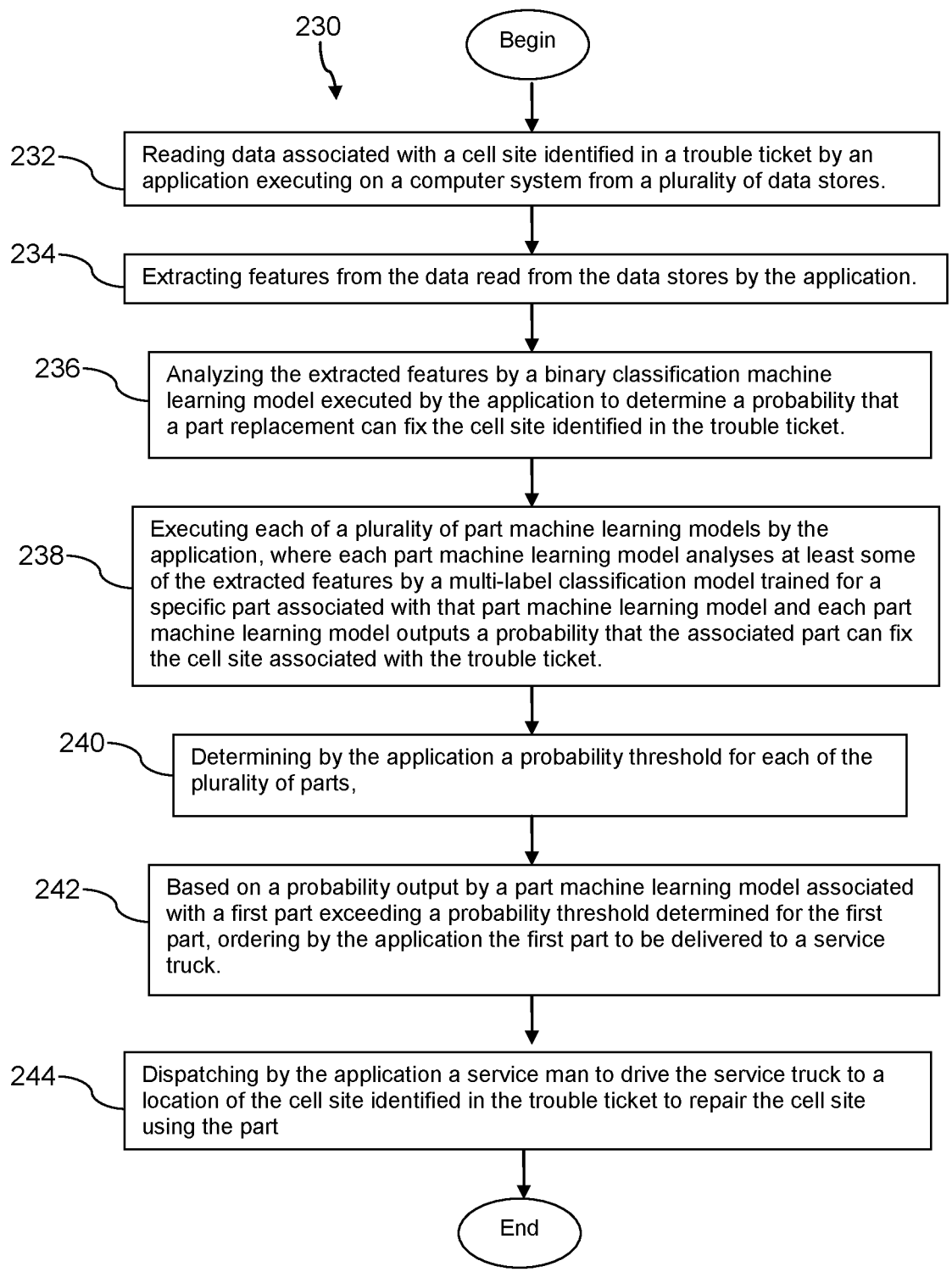
FIG. 4 is a flowchart of another method according to an embodiment of the disclosure.

Turning now to FIG. 4, a method 230 is described. In an embodiment, the method 230 is a method of repairing a cell site. At block 232, the method 230 comprises reading data associated with a cell site identified in a trouble ticket by an application executing on a computer system from a plurality of data stores.

At block 234, the method 230 comprises extracting features from the data read from the data stores by the application. The processing of block 234 may comprise executing a one-hot encoding method and/or executing a term frequency analysis method. At block 236, the method 230 comprises analyzing the extracted features by a binary classification machine learning model executed by the application to determine a probability that a part replacement can fix the cell site identified in the trouble ticket. A machine learning model of the binary classification machine learning model may be trained and/or retrained periodically, for example by analyzing closed cell site trouble tickets and other data.

At block 238, the method 230 comprises executing each of a plurality of part machine learning models by the application, where each part machine learning model analyses at least some of the extracted features by a multi-label classification model trained for a specific part associated with that part machine learning model and each part machine learning model outputs a probability that the associated part can fix the cell site associated with the trouble ticket. A machine learning model of each of the part machine learning models may be trained and/or retrained periodically, for example by analyzing closed cell site trouble tickets and other data.

At block 240, the method 230 comprises determining by the application a probability threshold for each of the plurality of parts. In an embodiment, determining a probability threshold for each of the plurality of parts is based on reading part inventory data from a cell site parts inventory data store.

At block 242, the method 230 comprises, based on a probability output by a part machine learning model associated with a first part exceeding a probability threshold determined for the first part, ordering the first part to be delivered to a service truck by the application. At block 244, the method 230 comprises dispatching by the application a service man to drive the service truck to a location of the cell site identified in the trouble ticket to repair the cell site using the part.

Figure 5:
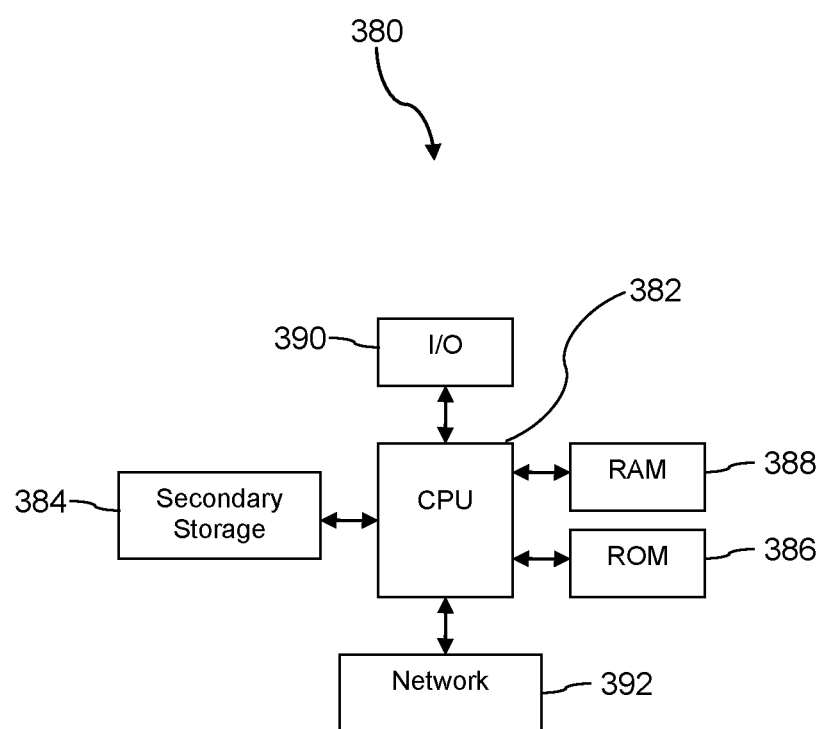
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time-division multiplexing (TDM), data over cable service interface specification (DOCSIS), wavelength division multiplexing (WDM), and/or the like. In an embodiment, the radio transceiver cards may provide wireless communication links using protocols such as code-division multiple access (CDMA), global system for mobile communications (GSM), long-term evolution (LTE), WiFi (IEEE 802.11), Bluetooth, ZigBee, narrowband Internet of things (NB IoT), near field communication (NFC), and radio frequency identification (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A cell site maintenance system, comprising:
   a cell site alarms data store;
   a cell site parts replacement history data store;
   a cell site trouble tickets data store;
   a processor;
   a non-transitory memory coupled to the processor; and
   a part replacement prediction application stored in the non-transitory memory that, when executed by the processor
      reads data associated with a cell site trouble ticket from the cell site alarms data store, from the cell site parts replacement history data store, and from the cell site trouble tickets data store,
      extracts features based on the data read from the data stores,
      executes a binary classification machine learning model that analyzes at least some of the extracted features to determine a probability that a part replacement can fix a cell site associated with the cell site trouble ticket,
      determines that the probability that a part replacement can fix the cell site associated with the cell site trouble ticket exceeds a first threshold,
      executes a plurality of part machine learning models, where each part machine learning model analyses at least some of the extracted features by a multi-label classification model trained for a specific part associated with that part machine learning model and each part machine learning model outputs a probability that the associated part can fix the cell site associated with the trouble ticket, and
      based on a probability output by a part machine learning model associated with a first part exceeding a second predefined threshold, ordering the first part be pulled from a part inventory.

2. The cell site maintenance system of claim 1, wherein the part replacement prediction application further orders that the first part be placed on a service truck pursuant to a service man driving the service truck to the cell site to respond to the trouble ticket.

3. The cell site maintenance system of claim 1, further comprising a cell site parts inventory data store, wherein the second predefined threshold is defined by the part machine learning model based on reading a current inventory of the first part from the cell site parts inventory data store.

4. The cell site maintenance system of claim 1, wherein extracting features comprises executing a one-hot encoding method.

5. The cell site maintenance system of claim 1, wherein extracting features comprises executing a feature hashing method.

6. The cell site maintenance system of claim 1, wherein extracting features comprises executing a term frequency analysis method.

7. The cell site maintenance system of claim 6, wherein extracting features based on the data read from the data stores comprises analyzing natural language data in the form of notes associated with the cell site trouble ticket with the term frequency analysis method, providing the output of the term frequency analysis method to the binary classification machine learning model and withholding the output of the term frequency analysis method from the plurality of part machine learning models.

8. A method of repairing a cell site, comprising:
   reading data associated with a cell site identified in a trouble ticket by an application executing on a computer system from a plurality of data stores;
   cleansing at least some of the data read from the data stores by the application;
   extracting features from the cleansed data by the application, wherein some of the extracted features are associated with tokenization based on natural language processing;
   analyzing the extracted features by a binary classification machine learning model executed by the application to determine a probability that a part replacement can fix the cell site identified in the trouble ticket;
   determining by the binary classification machine learning model that the probability that a part replacement can fix the cell site identified in the trouble ticket exceeds a first threshold;
   executing each of a plurality of part machine learning models by the application, where each part machine learning model analyses the extracted features excluding those extracted features associated with the tokenization based on natural language processing by a multi-label classification model trained for a specific part associated with that part machine learning model and each part machine learning model outputs a probability that the associated part can fix the cell site associated with the trouble ticket; and based on a probability output by a part machine learning model associated with a first part exceeding a second predefined threshold, determining by the application that the first part is to be pulled from a part inventory to make ready for a service truck visit to the cell site.

9. The method of claim 8, wherein cleansing at least some of the data comprises assigning an imputed value in place of a null value of the data and modifying some of the data to achieve consistent orthography.

10. The method of claim 8, wherein the second threshold is about 80 percent.

11. The method of claim 8, wherein the second threshold is about 75 percent.

12. The method of claim 8, wherein the plurality of part learning models comprise a first radio learning model associated with a radio manufactured by a first vendor, a second radio learning model associated with a radio manufactured by a second vendor, a controller card learning model, an antenna learning model, a router learning model, and a rectifier learning model.

13. The method of claim 8, wherein the plurality of data stores comprise a cell site alarms data store, a cell site trouble tickets data store, a cell site parts replacement history data store, and a cell site parts inventory data store.

14. The method of claim 8, further comprising performing feature scaling on extracted features before analyzing the extracted features by the binary classification machine learning model.

15. A method of repairing a cell site, comprising:

reading data associated with a cell site identified in a trouble ticket by an application executing on a computer system from a plurality of data stores;

extracting features from the data read from the data stores by the application;

analyzing the extracted features by a binary classification machine learning model executed by the application to determine a probability that a part replacement can fix the cell site identified in the trouble ticket;

executing each of a plurality of part machine learning models by the application, where each part machine learning model analyses at least some of the extracted features by a multi-label classification model trained for a specific part associated with that part machine learning model and each part machine learning model outputs a probability that the associated part can fix the cell site associated with the trouble ticket;

determining by the application a probability threshold for each of the plurality of parts;

based on a probability output by a part machine learning model associated with a first part exceeding a probability threshold determined for the first part, ordering the first part to be delivered to a service truck by the application; and dispatching by the application a service man to drive the service truck to a location of the cell site identified in the trouble ticket to repair the cell site using the part.

16. The method of claim 15, wherein determining a probability threshold for each of the plurality of parts is based on reading part inventory data from a cell site parts inventory data store.

17. The method of claim 15, further comprising training the binary classification machine learning model.

18. The method of claim 17, further comprising training the part machine learning models.

19. The method of claim 15, wherein extracting features comprises executing a one-hot encoding method.

20. The method of claim 15, wherein extracting features comprises executing a term frequency analysis method.

\* \* \* \* \*